Figure 1:
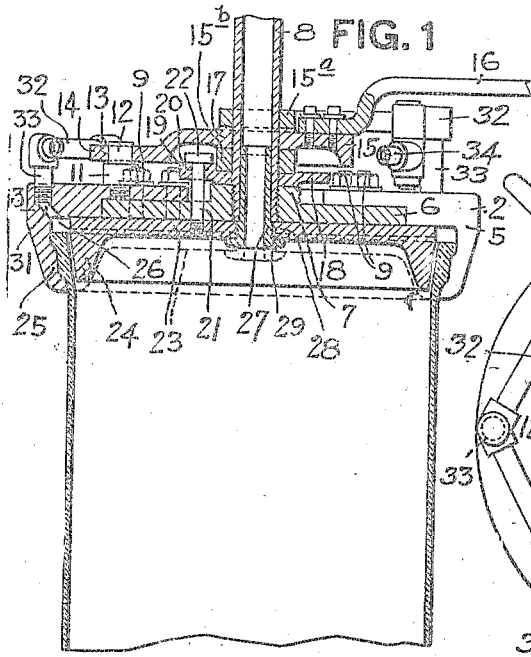

G. C. DEBAY.
GLASS BAIT.
APPLICATION FILED AUG. 2, 1917.

1,308,278.

Patented July 1, 1919.

INVENTOR
George C. Debay
By Ray Totten Powell
attys

UNITED STATES PATENT OFFICE.

GEORGE C. DEBAY, OF SPRINGDALE, PENNSYLVANIA, ASSIGNOR TO UNIVERSAL GLASS COMPANY, OF NEW KENSINGTON, PENNSYLVANIA, A CORPORATION OF DELAWARE.

GLASS-BAIT.

1,308,278.      Specification of Letters Patent.      Patented July 1, 1919.

Application filed August 2, 1917. Serial No. 184,144.

*To all whom it may concern:*

Be it known that I, GEORGE C. DEBAY, a citizen of the United States, and resident of Springdale, in the county of Allegheny and State of Pennsylvania, have invented a new and useful Improvement in Glass-Baits; and I do hereby declare the following to be a full, clear, and exact description thereof.

My invention relates to a bait for use in connection with the drawing of glass-cylinders.

The object of my invention is to provide a bait in which the connection between the molten glass and the bait is made without submerging the bait, and also to provide for relieving the strain on the glass engaging the bait due to the contracting caused by cooling.

Figure 3:
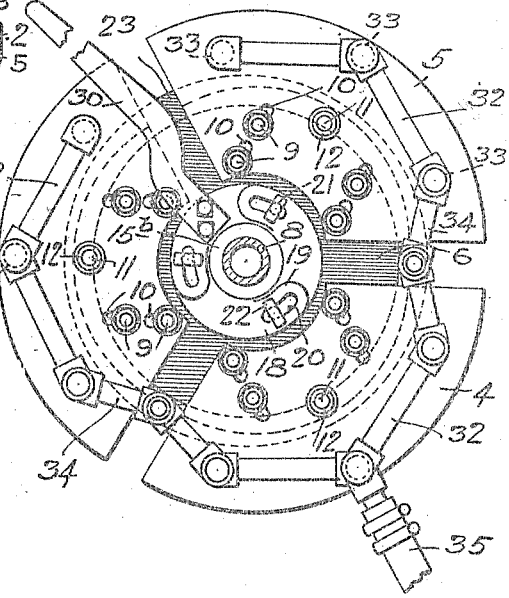
Figure 2:
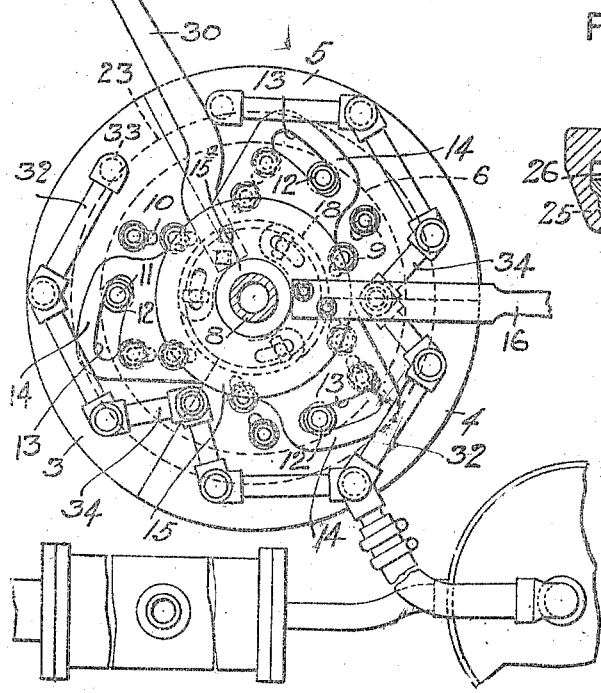
Figure 4:
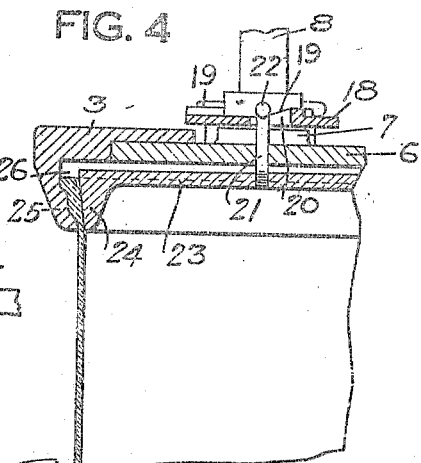

In the accompanying drawing, Figure 1 is a vertical sectional view of my improved bait showing the parts in full lines in position to relieve the strain due to contraction, the dotted lines in this figure indicating the position of parts when the bait is lowered to take up glass. Fig. 2 is a plan view thereof showing the several sections of which the bait is composed in closed position. Fig. 3 is a like view showing the sections released; and Fig. 4 is a sectional view of a portion of the bait showing the cam for releasing the contracting plate.

In the drawing, the numeral 2 designates the main body portion of the bait, which is preferably formed in two or more sections, the bait illustrated being composed of three sections 3, 4 and 5. These sections are made movable to provide for the releasing of the head of the cylinder, after it is drawn. A plate 6 has the hub portion 7 into which the blow pipe 8 is threaded.

The sections 3, 4 and 5 are slidable horizontally on the plate 6, and bolts 9 pass down through slots 10 in the sections 3, 4 and 5, and enter holes formed for them in the plate 6. In this way guiding means is provided for the sections as they move outwardly and inwardly.

Pins 11 extend up from the sections 3, 4 and 5, said pins bearing at their upper ends the idle-rollers 12 which engage the cam-slots 13 in the wings 14 of the plate 15. A handle 16 is secured to the plate 15 and by means of said handle, said plate is rotated around the blow-pipe 8, said plate having the hub-portion 17 surrounding said blow-pipe confined by the collars $15^a$ and $15^b$. By this movement of the plate 15 the cam-slots 13 acting on the pins 11 move the sections 3, 4 and 5 to and from each other for the purpose more fully hereinafter set forth.

A disk 18 surrounds the blow-pipe 8, said disk being interposed between the collar $15^b$ and the hub-portion 7 of the plate 6. This disk 18 is provided with the raised cam-portions 19 with the slots 20 formed therein. Bolts 21 engage the slots 20, said bolts having the heads 22 which are adapted to move up and down the cams 19. The inner ends of the bolts 21 are threaded into the contracting plate 23 whereby said plate is supported in position. The contracting plate 23 has the downwardly and inwardly inclined peripheral portion 24 which with the downwardly extending flange 25 of the sections 3, 4 and 5 form an annular cavity or recess 26.

A gland 27 is threaded into an opening 28 in the contracting plate 23, said gland extending into the blow pipe and having the outer flange head 29.

A handle 30 is connected to the disk 18 by means of which said disk is turned, whereby the contracting plate 23 is raised and lowered.

Instead of submerging the bait in the molten glass in order to form a connection between the bait and the molten glass for drawing purposes, I introduce the glass into the pocket or recess 26 by means of suction, and for this purpose the sections 3, 4 and 5 are provided with the ports 31 which communicate with the pocket 26. Pipes 32 have the connections 33 connected up with each port, and each set of pipes 32 of each section is connected up to the pipes of the other sections by the flexible connections 34 which permits of the separation of the sections to release the cylinder head as shown in Fig. 3. The suction-pipe 35 is connected up to this system of pipes in order to create sufficient suction to draw the glass up into the annular cavity 26. The suction-pipe 35 is connected up to any suitable pump or fan which will give the required suction action, and I have illustrated a suitable device for this purpose.

When my improved bait is in use with the parts in position as indicated in dotted lines Fig. 1 and in Fig. 4, the bait is lowered down to the surface of the molten glass, whereupon by applying suction to the pipe 35 the molten glass is sucked or drawn up into the annular recess 26 as indicated in Fig. 4. The drawing operation now begins and in order to relieve the strain on the head 36 the contracting plate 23 is raised which is done by turning the handle 30 and through the disk 18 and the cams 19, the contracting plate is raised to the position indicated in Fig. 1, thereby relieving the strain on the cylinder head 36, and permitting it to contract without danger of breaking and so destroying the entire cylinder.

It will be understood that the suction is maintained until the cylinder has been drawn to a sufficient length to cause the chilling of the glass in the bait, whereupon the suction is dispensed with and the cylinder drawn by the engagement of the glass with the bait due to the chilling of same.

After the cylinder has been drawn to the desired length it is released from the bait by operating the handle 16 to turn the disk 15 which acts through the parts described to expand the bait or separate the sections 3, 4 and 5 thereof as indicated in Fig. 3 permitting the cylinder head to be released from the bait.

By my invention I provide a bait which is not submerged in the molten glass to make the connection therewith, whereby the wear and tear on the bait is accordingly reduced, and by sucking the glass up into the bait the glass chills more readily and the drawing can proceed with less delay.

Furthermore, I provide means for relieving the strains on the head due to contraction thereby creating a great saving in cylinder, and, when the cylinder is drawn, by the mere movement of a lever, the cylinder can be released without being cracked off the bait.

What I claim is:

1. A bait for drawing glass cylinders having a downwardly extending flange portion, a contracting member forming with said downwardly extending flange an annular cavity to receive the glass, and means for increasing the size of said cavity by the movement of said contracting member, whereby the strain on the head of the cylinder is relieved.

2. A bait for drawing glass cylinders having a downwardly extending flange portion, a contracting plate having a peripheral portion forming with the first-named flange portion an annular cavity to receive the glass, and means for moving said contracting plate to increase the size of said cavity whereby the strain on the head of the cylinder is relieved.

3. A bait for drawing glass cylinders having a downwardly extending flange portion, a contracting plate having an inwardly inclined peripheral portion forming with said first-named flange portion a cavity to receive the glass, and means for raising said contracting plate.

4. A bait for drawing glass cylinders having a downwardly extending flange portion, a contracting plate having an inwardly inclined peripheral portion forming with said first flange portion a cavity to receive the glass, a rotary disk having cam faces and slots therein, and bolts extending through said slots and engaging said contracting plate.

5. A bait for drawing glass cylinders having a cavity to receive the glass, a plurality of segmental horizontally movable sections, said sections having ports communicating with said cavity, pipes connecting with said ports, flexible connections between the pipes of the several sections, and a suction pipe connected up to the pipes of one section.

In testimony whereof, I the said GEORGE C. DEBAY, have hereunto set my hand.

GEORGE C. DEBAY.

Witnesses:
JOHN F. WILL,
S. F. ARMSTRONG.